Jan. 2, 1962    C. MENDES    3,015,318
AIR BRAKE BOOSTER
Filed April 4, 1960
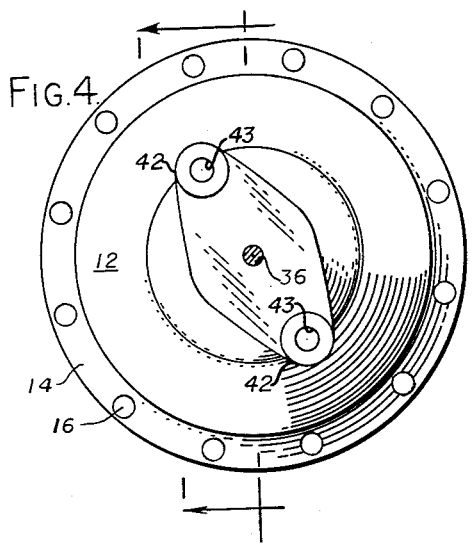
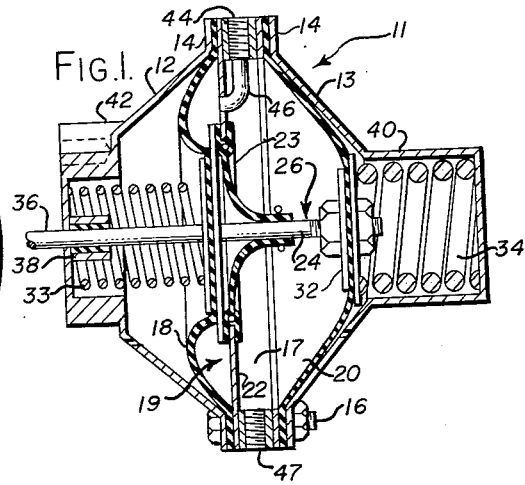
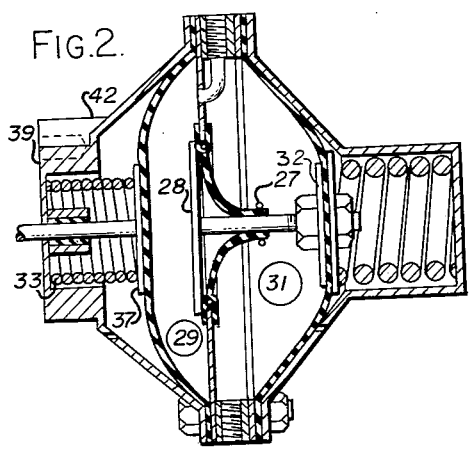
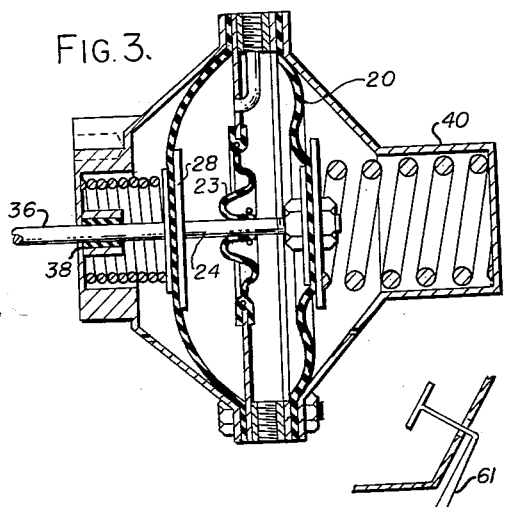
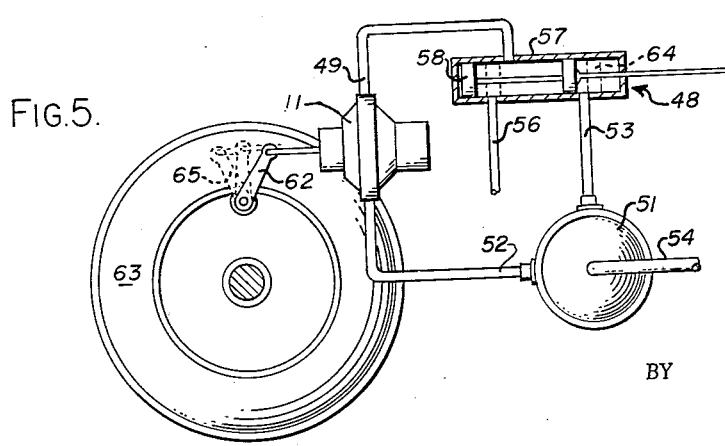
INVENTOR.
CLARENCE MENDES
BY  Paul Bliven
ATTORNEY.

United States Patent Office 3,015,318
Patented Jan. 2, 1962

3,015,318
AIR BRAKE BOOSTER
Clarence Mendes, San Jose, Calif.
(744 Lemos Ave., Salinas, Calif.)
Filed Apr. 4, 1960, Ser. No. 19,785
9 Claims. (Cl. 121—48)

The present invention relates to an air brake booster which is constructed and operated so that a loss in air pressure in the system in which the booster is fitted, from any cause, will effect operation of the booster and, thereby, setting of the brake or brakes controlled by the booster, or other boosters, of a like construction, in such system.

The patent to Beman, 2,754,805, July 17, 1956, Cl. 121—38, is a good example of the prior art for accomplishing the above purpose. While the Beman device is intended for use similar to the present device, it and the other prior devices of a similar nature are too complicated, have too many parts, and have parts which cannot be made rugged enough, reliable enough, or trouble free enough for the type of service to which air brake boosters are subjected in most of the heavy truck fields of operation.

Having in mind the above and other defects of the prior art devices, it is an object of the present invention to devise such a truck brake booster that is simple in construction and operation, and which will operate when the system in which it is fitted loses air pressure.

A further object of the present invention is the devising of such a booster using flat diaphragms and without the use of packing glands or other types of seals, except such diaphragms.

Another object of the present invention is the construction of the shell of a booster so that it is composed of two similar or like cup-shaped parts so as to simplify the construction thereof.

Further, the present invention relates to a booster in which a coiled spring moves to set the brake to which the booster is connected, when the system air pressure drops below a designed value, and, in which, when the air pressure is above such designed value, the air in the system keeps such spring compressed and the brakes unset.

The above defects of the prior art devices are remedied and these objects achieved by a booster construction in which there is a shell composed of two similar or like flange lipped cup shaped, or dish shaped, parts, or halves, which house the booster mechanisms. These halves bolt together on a piping ring and on three coaxial and circular diaphragms which extend across the ring. The middle one, the inner one, of these diaphragms has a rigid annular and a flexible central portion which seals on the stem of a spool coaxial of the diaphragms. The heads of this spool are between and bear on the inside faces of the other, the outer, diaphragms, and, when air under pressure is not supplied to the booster, the outer diaphragms are forced, biased, against the spool heads by a spring between each outer diaphragm and an opposed shell half. One such spring, a light spring, acts as a service spring for the return of a brake link having a head placed between spring and diaphragm. The stem of such link extends thru and coaxial of such light spring and shell half against which such spring bears. The other spring, a heavy, or stiff, spring, as compared to the first spring, acts as a safety brake setting spring.

After the springs which bear directly against them, the diaphragms may be called the service diaphragm and the safety diaphragm; and the space between each diaphragm and the inner diaphragm, the service and the safety space. Two air openings are formed in the ring, one communicating with the service space and the other with the safety space. The service air opening is piped to the truck's air-brake valve, and receives air therefrom when the valve is moved to braking position, and releases air to the valve when it is moved to off, or release, position. In this service operation of the booster, its operation is that of other boosters usually found on trucks. The safety air opening is piped directly to the air supply reservoir of the truck. As long as air having a designed pressure is in the reservoir and the safety space, the safety spring is compressed by the safety diaphragm carrying the safety head end of the spool against such spring. In this position, the other head of the spool is brought against the rigid annulus to seal the opening therein and to back up the flexible center of such inner diaphragm. If there is a failure in air pressure, the safety spring will expand moving the safety diaphragm and the spool to cause the safety head of the spool to move the service diaphragm and brake link, and to compress the link return spring. Thus the booster acts to set its connected brake or brakes when the air supply fails, falls below a designed value. In normal service operation of the booster, the inner diaphragm does not operate as a seal, the service head of the spool seals the opening in the rigid annulus.

Having briefly described an embodiment of my invention, and the objects thereof, such embodiment is hereinafter described in detail in relationship to the accompanying drawings, in which:

FIGURES 1, 2, and 3 are diametrical sectional views of a booster embodying the present invention, and each of which views show the mechanisms of the booster in a different operative position. These sections are taken on the line 1—1 of FIGURE 4.

FIGURE 1 shows the booster with air pressure applied only to the safety space thereof, the booster and truck running position, brakes not applied.

FIGURE 2 shows the booster with air pressure applied to both safety and service spaces thereof, the booster and truck service braking position, ordinary usage, brakes applied.

FIGURE 3 shows the booster without air pressure applied to either of the spaces thereof, the booster and truck emergency braking position, the safety operation of the booster, brakes applied.

FIGURE 4 is a view of the left hand end of the booster as shown in FIGURES 1, 2, and 3.

FIGURE 5 is a schematic showing of the incorporation of the booster of FIGURES 1 to 4, inclusive, in a truck braking system.

FIGURES 1, 2, and 3 of the drawings show the details of construction of one embodiment of the present invention. These views are taken on a diameter and on what may be called the longitudinal axis of the brake booster assembly 11. The housing shell of this assembly is in the form of a pair of similar, or identical, dish shaped circular parts, or halves, 12, 13. Each of these parts is provided with a flange 14 which is in opposition to the flange of the other part, and these flanges are provided with evenly spaced apart bolt holes which are in alignment from one flange to the other. A bolt 16 passes thru each of the aligned holes and with the aid of a nut threaded on the bolt serves to clamp the halves together on a piping ring 17 and three diaphragms 18, 19, 20 coextensive of the ring, and all coaxially arranged. As shown in the drawings, the left hand diaphragm 18 may be called the service diaphragm; the middle diaphragm 19, the inner diaphragm, or septum; and the right hand diaphragm 20, the safety diaphragm. The septum is made in two parts, a rigid annulus 22 and a flexible central disc 23 which has a small central opening therein thru which extends the stem 24 of a spool 26. The disc is sealed to the spool stem 24 in any suitable manner such as by means of a clamping ring 27. The disc may be integrated with the annulus 22 by means of a suitable adhesive. It is desirable that the disc overlap the annulus on its left hand side, its service side, so that such overlap may serve as a gasket, and so that the left hand head 28 of the spool 26 may seat on such overlap and seal on and to the annulus 22. The disc 23, and the service 18 and safety 20 diaphragms are made of rubber, or a flexible rubber-like material, suitable for the present use. The space between the septum 19 and the service diaphragm 18 may be called the service space 29, and the space between the septum and the safety diaphragm 20 may be called the safety space 31. Similarly, the left hand head 28 of the spool 26 may be called the service head, and the right hand head 32 of the spool may be called the safety head. This safety head 32 is composed of two disc-like washers, one on each side of the safety diaphragm 20 with the stem 24 of the spool extending thru such washers and the washers being clamped together and held on the stem by a pair of nuts threaded thereon.

The spool 26 is centered in the assembly 11 and its two shell halves 12, 13 by being secured to and centrally of the inner 19 and safety 20 diaphragms, and is, in the showings in FIGURES 1 and 3, held between two springs 33, 34. The left hand spring 33 may be called the service spring. Its function is to return a brake link 36 from its FIGURE 2 and 3 position to the position shown in FIGURE 1. This brake link is placed coaxially of the assembly 11 and extends outwardly of the left hand half 12, the service half of the assembly, thru the service spring 33, and at its right hand end is secured to a disc 37 which is located between the service spring and the service diaphragm 18. It is the service spring bearing against this link head 37 that locates the brake link 36 in the position in which it is shown in FIGURE 1. A bearing 38 is provided for the brake link 36, and this bearing is secured to the service half 12 of the assembly. The service spring 33 is housed and seated in a cylindrical cup portion 39 of the service half 12 of the assembly Also, the right hand spring 34, the safety spring, is housed and seated in a cylindrical cup 40 which is part of the safety half 13 of the assembly 11.

Integrated with the service spring cup 39 and extending outwardly therefrom are a pair of booster mounting ears 42 which have tapped holes 43 therein for the reception of cap screws (not shown) which secure the booster to a truck axle housing (not shown).

The piping ring 17 has an opening 44 therethru which is in communication with the service space 29 by means of a short duct 46 which passes thru the rigid septum-annulus 22; and diametrically opposed thereto the ring has an opening 47 therethru which is in communication with the safety space 31. Each of these openings 44, 47 has threaded therein the end of a pipe which is a part of the schematic showing of FIGURE 5 of the incorporation of the booster, above described, in a truck braking system.

In this showing of FIGURE 5, the service opening 44 in the ring 17 is in communication with a brake control valve 48 by means of a service pipe 49, and the safety opening 47 is in communication with an air supply reservoir 51 of the braking system by means of a safety pipe 52. The reservoir 51 is, also, in communication with the control valve 48 by means of a supply pipe 53, and is in communication with an air pump (not shown) by means of a pump line 54. The control valve 48 is vented thru a vent pipe 56. The control valve may be of a type usual in such systems, and is here shown as a cylinder 57 with closed ends, a balanced spool valve 58 secured to one end of a valve rod 59 which is slidable in a seal in one end of the cylinder 57, and which is shown, for example, pin connected at its other end to a foot operable brake pedal arm 61. Other suitable means may be used for operation of the valve 48. The brake link 36 of the booster is pin connected to a brake arm 62 of a mechanical brake (not shown) on a wheel 63.

In FIGURE 5, the full line showing of the spool valve 58 of the brake control valve 48 corresponds to the full line showing of the brake arm 62; and the dotted line showing 64 of the brake control valve spool 58 corresponds to the left hand dotted line showing 65 of the brake arm 62. The full line showing of FIGURE 5 of the control valve spool 58 and of the brake arm 62, corresponds to the condition of the booster assembly mechanisms shown in FIGURE 1, the brake not applied; while the dotted line showings 64, 65 correspond to the condition of the mechanisms shown in FIGURE 2, the brake applied for ordinary, or service, usage. The condition of the mechanisms in FIGURE 3 may occur when the control valve 58 is in either of its shown positions; of course, when the mechanisms are as in FIGURE 3, the brake arm will be in its dotted line position 62 as it is intended that the brake arm 62 be in its dotted line position 62, its brake applied position, when the safety spring is expanded as shown in FIGURE 3.

In the operation of the truck brake system schematically shown in FIGURE 5 and incorporating the booster shown in detail in the other figures of the drawing, when the air supply reservoir 51 is filled to the operating, or working pressure with air from the pump line 54, and the brake valve 58 is in its full line position, the booster diaphragms 18, 20 and the booster spool 26 will be in the position shown in FIGURE 1. Air at operating pressure from the reservoir thru the safety pipe 52 is applied in the safety space 31 while the service space 29 is at atmospheric pressure. This operating air pressure keeps the safety spring 34 in its compressed condition, and the brake arm 62 and link 36 are held in their brake unapplied positions by the service spring 33.

When the pedal arm 61 is depressed, the brake valve spool 58 will move to its dotted line position 64. This allows air under reservoir operating pressure to enter the brake cylinder 57 from the reservoir thru the supply pipe 53; to pass thru the brake cylinder, the service pipe 49, and the service duct 46; and to pass into the service space 29 where the air forces the service diaphragm from its right hand position of FIGURE 1 to its left hand position of FIGURE 2. The spool 26, and the safety diaphragm 20 will remain in their FIGURE 1 positions, as is, also, shown in FIGURE 2. This movement of the service diaphragm to the left, compresses the service spring 33, moves the brake link 36 to the left, and moves the brake arm 62 to its dotted line position 65, thus to apply the brake (not shown) of the wheel 63. When the brake valve spool is returned to its full line position of FIGURE 5 from the dotted line showing 64, the air under pressure in the booster will vent to and thru the brake cylinder 57, and out the vent pipe 56 to the atmosphere, to allow the booster mechanisms to again take their FIGURE 1 positions.

The safety spring 34 is so designed that its loading and deflection will substantially take the place of the service diaphragm in moving the brake arm 62 to apply the brake associated with the wheel 63, when, from any cause, the reservoir 51 and, hence, the booster safety space 31 lose or do not have their intended, designed, working air pressure. As the air pressure drops from that which keeps the safety spring 34 compressed, the spring expands, and the safety diaphragm 20 and the attached spool 26 move to the left to the position shown in FIGURE 3. Also, if there is no air in the reservoir, there will be no air pressure in the service space 29, and the leftward movement of the spool 26 will move the service diaphragm 18, and the brake link head 37 and its link 36 to the left, and will compress the service spring 33. All the above action results in these mechanisms assuming the positions shown in FIGURE 3 and in the brake of the wheel 63 being applied by movement of the brake arm to its dotted line position 65, FIGURE 5.

The FIGURE 3 positions of the mechanisms, also, are the positions before air is supplied to the system shown in FIGURE 5. As air under pressure is supplied to the reservoir 51 from the pump line 54, air will flow thru the safety pipe 52 to the safety space 31, and there will be a gradual transition from the conditions of FIGURE 3 to those of FIGURE 1. This is assuming that the brake valve 58 is and remains in its full line position. If the brake valve is in its dotted line position 64, then the transition from FIGURE 3 will be to the positions of FIGURE 2. The product of the unit working pressure of the air and the area of the safety diaphragm 20 gives sufficient force to compress the safety spring 34 to its condition of FIGURE 3. While the safety spring is being compressed from FIGURE 3 to FIGURE 1, the flexible central disc 23 of the diaphragm 19 seals the opening in the rigid annulus 22.

The compression of the safety spring 34 is limited by the service head 28 of the spool 26 seating on the rigid annulus 22 and sealing thereon due to the presence of the peripheral edge of the flexible disc 23 acting as a gasket and being between the annulus and the spool head 28. This seating and sealing of the service head 28 on the annulus 22, takes the air load off the flexible disc 23.

By means of the above described embodiment of my invention, a truck's brakes will set and hold the truck from moving or stop its motion, whenever air is not supplied to the truck's boosters while the truck is parked or whenever such air supply fails while the truck is in motion. Further, the construction of the present device is very simple, it is not a radical departure from presently used principles or design fundamentals, and it is reliable and effective in operation.

Having thus described my invention, its construction and use, I claim:

1. An air brake booster, comprising: a pair of similar, flange lipped, circular, cup-shaped parts arranged coaxially with their open ends and flanges in opposition and their bottoms away from each other, three diaphragms extending across and between said cups and flanges, a piping ring between and peripherally coextensive with said flanges, and means clamping together the above parts; one of said cups being a service cup and the other a safety cup, said diaphragms being a service, a septum, and a safety diaphragm, said septum diaphragm being between said service and safety diaphragms which, respectively, close said service and safety cup open ends, said septum diaphragm being formed with a rigid annulus and a flexible disc across the opening of said annulus, said service and safety diaphragms and said septum disc being formed of a flexible rubber like material, said service and safety diaphragms each being flexible and movable to each form a space between it and said septum, the space between service diaphragm and septum being a service space, and the space between safety diaphragm and septum being a safety space; a service compression spring between said service cup bottom and said service diaphragm and coaxial thereof, a safety compression spring between said safety cup bottom and said safety diaphragm and coaxial thereof, a brake link extending coaxially of said cups and thru said service spring and the bottom of said service cup, a head secured to said link and extending between said service spring and said service diaphagm, a spool having a stem extending coaxially of said cups and sealed thru said septum disc, a service head on one end of said stem and in said service space, on the other end thereof, a safety head secured to said safety diaphragm, a service opening and a safety opening formed in said piping ring and said openings communicating with said service space and with said safety space, respectively, said safety spring being stiffer than said service spring, and said spool service head seating on said annulus upon compression of said safety spring; whereby the admission of air under pressure thru said service opening into said service space will move said service diaphragm and actuate said brake link, whereby the admission of air under pressure thru said safety opening into said safety space will move said safety diaphragm to compress said safety spring and will move said spool to cause its service head to seat on said annulus, and whereby the absence of air under pressure in said spaces will allow said safety spring to move said diaphragms and to actuate said brake link.

2. An air brake booster, comprising: a shell, a service diaphragm, a septum, and a safety diaphragm extending across and dividing said shell, and a spool having a stem and a head at each end thereof, said diaphragms being composed of flexible rubber like material, said septum having a rigid annulus thru the opening of which said stem extends, one of said heads adapted to seal said annulus opening, and one of said heads adapted to move with one of said diaphragms.

3. The combination of claim 2 which has added thereto springs adapted to bias said diaphragms inwardly of said shell, and said springs being of unequal stiffness.

4. An air brake booster, comprising: a shell composed of two like circular cup-shaped parts, a spring cylinder formed in the bottom of each cup part, a spring in each cylinder, one spring being stiffer than the other, and between said springs and diametrical and peripheral of said shell and between said cups, three diaphragms extending across and sealing one cup from the other.

5. An air brake booster, comprising: a shell, a service diaphragm, a septum, a safety diaphragm extending across said shell and forming therebetween a service space and a safety space, a brake link extending thru said shell, a service spring biasing said link inwardly of said shell and against said service diaphragm, a stem between said diaphragms and sealed thru said septum, a safety spring stiffer than said service spring, said safety spring biasing said safety diaphragm and said stem toward said service diaphragm and link, and separate means for admitting air under pressure to each of said spaces, said safety spring being a compression spring, said septum having a rigid annulus, and said stem having a head which seals the opening in said annulus when said safety spring is compressed.

6. The combination of claim 5 which has added thereto a flexible disc closing the opening of said annulus and sealed to said stem.

7. The combination of claim 5 in which each of said diaphragms is composed of a flexible rubber like material.

8. An air brake booster, comprising a shell, a service diaphragm, a septum, and a safety diaphragm extending across said shell and forming therebetween a service space and a safety space, a brake link extending thru said shell in position to be contacted and moved by said service diaphragm, said septum being between said diaphragms and formed with an opening therethru, a stem between said diaphragms and extending thru the opening in said septum, a safety spring biasing said safety diaphragm and said stem toward said service diaphragm and link, separate means for admitting air to each of said spaces to control the positions of said diaphragms, and said stem having a head which seals the opening in said septum when said spring bias is increased by the air control of said safety diaphragm to move such from said service diaphragm.

9. An air brake booster, comprising: a service diaphragm, a safety diaphragm, and a septum therebetween, means sealing together the peripheral edges of said diaphragms and septum to form a service space between said service diaphragm and said septum and a safety space between said safety diaphragm and said septum, said septum being formed with an opening therethru and a headed stem extending between said diaphragms, thru septum opening, and being secured to said safety diaphragm, and means for supplying air to said safety space to move said safety diaphragm from said septum, and to seat said stem head on said septum to close and seal said septum opening.

References Cited in the file of this patent
UNITED STATES PATENTS

| | | |
|---|---|---|
| 2,754,805 | Beman | July 17, 1956 |
| 2,854,954 | Howze | Oct. 7, 1958 |